(12) United States Patent
Chen (10) Patent No.: US 12,539,608 B2
(45) Date of Patent: Feb. 3, 2026

(54) SYSTEMS AND METHODS FOR MOTION CONTROL OF ROBOTS

(71) Applicant: KEYWESTTECH LLC., Rolling Meadows, IL (US)

(72) Inventor: Ming Chen, Hangzhou (CN)

(73) Assignee: KEYWESTTECH LLC., Rolling Meadows, IL (US)

( * ) Notice: Subject to any disclaimer, the term of this patent is extended or adjusted under 35 U.S.C. 154(b) by 250 days.

(21) Appl. No.: 18/178,566

(22) Filed: Mar. 6, 2023

(65) Prior Publication Data

US 2024/0300105 A1  Sep. 12, 2024

(51) Int. Cl.
*B25J 9/16* (2006.01)

(52) U.S. Cl.
CPC .............. *B25J 9/1664* (2013.01); *B25J 9/163* (2013.01)

(58) Field of Classification Search
CPC ................................. B25J 9/1664; B25J 9/163
See application file for complete search history.

(56) References Cited

U.S. PATENT DOCUMENTS

| 9,925,662 | B1 * | 3/2018 | Jules ..................... G05B 19/423 |
| 2019/0034794 | A1 * | 1/2019 | Ogale .................. G05D 1/0212 |
| 2019/0184561 | A1 * | 6/2019 | Yip ........................ G06N 3/044 |
| 2019/0232488 | A1 * | 8/2019 | Levine ..................... B25J 9/161 |
| 2019/0314989 | A1 * | 10/2019 | Sokabe .................. B25J 9/1664 |
| 2023/0356748 | A1 * | 11/2023 | Hetang .............. G05B 13/0265 |

FOREIGN PATENT DOCUMENTS

| CN | 106052683 A | 10/2016 |
| CN | 111230866 A | 6/2020 |
| CN | 113510709 A | 10/2021 |

* cited by examiner

*Primary Examiner* — Abby Lin
*Assistant Examiner* — Karston G. Evans
(74) *Attorney, Agent, or Firm* — METIS IP LLC (57) ABSTRACT

A method and system for motion control may be provided. A target trajectory of an object to be moved may be obtained. The object may be caused to move along the target trajectory of the object based on one or more motion parameters of the object during the movement of the object. At least a portion of the one or more motion parameters of the object may be determined using a motion parameter determination model. The one or more motion parameters of the object may include at least one of a pose parameter, an acceleration parameter, or a speed parameter.

7 Claims, 4 Drawing Sheets

SYSTEMS AND METHODS FOR MOTION CONTROL OF ROBOTS

TECHNICAL FIELD

The present disclosure relates to robot control technology, and in particular, to systems and methods for motion control of a robot.

BACKGROUND

Robots are widely used for assisting or replacing the works of humans, such as in the production industry, the construction industry, etc. When a robot performs task operations, such as object handling in a warehouse, a motion of the robot needs to be accurately controlled, so that the robot can move along a target trajectory to complete the task operations. It is desired to provide methods and systems for accurate and efficient motion control of a robot.

SUMMARY

According to an aspect of the present disclosure, a system for motion control may be provided. The system may include at least one storage device including a set of instructions and at least one processor in communication with the at least one storage device. When executing the set of instructions, the at least one processor may be configured to direct the system to perform the following operations. The system may obtain a target trajectory of an object to be moved. The system may further cause the object to move along the target trajectory of the object based on one or more motion parameters of the object during the movement of the object. The at least a portion of the one or more motion parameters of the object may be determined using a motion parameter determination model, and the one or more motion parameters of the object may include at least one of a pose parameter, an acceleration parameter, or a speed parameter.

In some embodiments, the target trajectory of the object may include a plurality of target trajectory points, to cause the object to move along the target trajectory of the object based on one or more motion parameters of the object during the movement of the object, the system may perform the following operations. For each target trajectory point of the plurality of target trajectory points, the system may obtain one or more current motion parameters of the object corresponding to the each target trajectory point and one or more target motion parameters corresponding to a next target trajectory point adjacent to the each target trajectory point. The system may also determine one or more motion adjustment parameters of the object using the motion parameter determination model based on the one or more current motion parameters and the one or more target motion parameters. The one or more motion adjustment parameters may indicate one or more changes in the one or more current motion parameters of the object. The system may further cause the object to move from the each target trajectory point to the next target trajectory point based on the one or more motion adjustment parameters.

In some embodiments, the one or more target motion parameters may include a target pose.

In some embodiments, to generate the motion parameter determination model the system may perform one or more of the following operations. The system may obtain one or more groups of training samples. The system may generate the motion parameter determination model by training a preliminary model using the one or more groups of training samples. Each group of training samples may include one or more training samples. Each training sample may include one or more sample current motion parameters of a sample object corresponding to a first sample trajectory point, one or more sample target motion parameters of the sample object corresponding to a second sample trajectory point, the second sample trajectory point being next to the first sample trajectory point, one or more sample motion adjustment parameters of the sample object indicating one or more changes in the one or more sample current motion parameters of the sample object, a sample reward corresponding to the first sample trajectory point, and sample information relating to a sample trajectory of a sample motion of the sample object on which the first sample trajectory point is located.

In some embodiments, the one or more sample target motion parameters may include a sample target pose.

In some embodiments, to generate the one or more groups of training samples the system may perform one or more of the following operations. The system may obtain a plurality of reference trajectory points of a reference object from a sample pool. For each reference trajectory point of the plurality of reference trajectory points, the system may obtain one or more reference motion parameters and one or more reference motion adjustment parameters of the reference object corresponding to the each reference trajectory point, the one or more reference motion adjustment parameters may indicate one or more changes in the one or more reference motion parameters. The system may also generate an experience replay pool based on the one or more reference motion parameters and the one or more reference motion adjustment parameters corresponding to the each reference trajectory point. The system may further generate the one or more groups of training samples based on the experience replay pool.

In some embodiments, to obtain a plurality of reference trajectory points of a reference object, the system may determine a duration of the movement of the reference object between each two adjacent trajectory points in the plurality of initial motions of the reference object based on information relating to a plurality of initial motions of the reference object. The system may further determine the reference trajectory points based on the duration of the movement of the reference object between each two adjacent trajectory points.

In some embodiments, to generate an experience replay pool based on the one or more reference motion parameters and the one or more reference motion adjustment parameters corresponding to the each reference trajectory point, the system may perform one or more of the following operations. For the each reference trajectory point, the system may determine one or more reference target motion parameters of the reference object corresponding to a reference target trajectory point based on the one or more reference motion parameters and the one or more reference motion adjustment parameters. The system may also determine a reward corresponding to the reference trajectory point. The system may further designate the one or more reference motion parameters, the one or more reference target motion parameters, the one or more reference motion adjustment parameters, the reward corresponding to the reference trajectory point, and information relating to a reference trajectory on which the reference trajectory point and the reference target trajectory point are located as reference data corresponding to the each reference trajectory point. Further, the system may generate the experience replay pool based on the reference data corresponding to the plurality of reference trajectory points.

In some embodiments, the sample pool may include initial target motion parameters corresponding to initial target trajectory points of one or more initial target trajectories, and the one or more reference motion adjustment parameters may satisfy a constraint condition determined by performing a clustering on the initial target motion parameters corresponding to the initial target trajectory points.

In some embodiments, to obtain a plurality of reference trajectory points of a reference object from a sample pool, the system may obtain a plurality of candidate trajectory points from the sample pool. The system may further determine the reference trajectory points based on the plurality of candidate trajectory points.

In some embodiments, an amount of the plurality of reference trajectory points may be associated with initial trajectory error information corresponding to initial trajectory points of a plurality of initial motions.

In some embodiments, to determine a reward corresponding to the reference trajectory point, the system may obtain information relating to a reference portion of the reference trajectory based on the one or more reference motion parameters and the one or more reference motion adjustment parameters. The portion of the reference trajectory may be from a starting trajectory point of the reference trajectory to the reference target trajectory point. The system may further determine the reward corresponding to the reference trajectory point based on the information relating to the reference portion of the reference trajectory.

In some embodiments, the reference trajectory may include a plurality of initial trajectory points, the reference trajectory point is one of the plurality of initial trajectory points. The information relating to the reference portion may include reference motion fault information indicating whether there are one or more motion fault trajectory points on the reference portion, reference duration information corresponding to the reference portion, reference trajectory error information corresponding to the reference portion, and reference deviation information between each of initial trajectory points on the reference portion and an initial target trajectory point corresponding to the each of the initial trajectory points.

In some embodiments, the reference deviation information may include at least one of a reference count or a reference distribution of initial trajectory points that deviate from the corresponding initial target trajectory points by smaller than a distance threshold.

In some embodiments, if the reference motion fault information indicates that there are one or more motion fault trajectory points, the reference motion fault information may include a duration of the movement of the reference object from a starting trajectory point of the reference portion to the earliest motion fault trajectory point.

In some embodiments, the reward may be associated with a length of the reference trajectory.

In some embodiments, the preliminary model may be a deep deterministic policy gradient (DDPG) model.

According to an aspect of the present disclosure, a system for motion control may be provided. The system may include at least one storage device including a set of instructions and at least one processor in communication with the at least one storage device. When executing the set of instructions, the at least one processor may be configured to direct the system to perform the following operations. The system may obtain one or more groups of training samples.

The system may further generate the motion parameter determination model by training a preliminary model using the one or more groups of training samples. Each group of training samples may include one or more training samples. Each training sample may include one or more sample current motion parameters of a sample object corresponding to a first sample trajectory point, one or more sample target motion parameters of the sample object corresponding to a second sample trajectory point next to the first sample trajectory point, one or more sample motion adjustment parameters of the sample object indicating one or more changes in the one or more sample current motion parameters of the sample object, a sample reward corresponding to the first sample trajectory point, and sample information relating to a sample trajectory of a sample motion of the sample object on which the first sample trajectory point is located.

According to an aspect of the present disclosure, a method for motion control may be provided. The method may include obtain a target trajectory of an object to be moved. The method may further include cause the object to move along the target trajectory of the object based on one or more motion parameters of the object during the movement of the object. At least a portion of the one or more motion parameters of the object may be determined using a motion parameter determination model. The one or more motion parameters of the object may include at least one of a pose parameter, an acceleration parameter, or a speed parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first," "second," or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

A conventional motion control approach for robot usually only involves position (or pose) adjustment (or optimization) during motion of the robot, so that the robot can move along a target trajectory to perform a task. Some motion control approaches involve both position (or pose) and acceleration adjustment (or optimization). However, during the motion of the robot along the target trajectory, for each target trajectory point on the target trajectory, a pose of the robot is usually adjusted/optimized first to improve the accuracy of the motion trajectory of the robot, and then the acceleration is adjusted/optimized after the pose is adjusted/optimized to improve the efficiency of the motion of robot, which has a limited accuracy and efficiency.

The present disclosure relates to systems and methods for motion control. The systems may obtain a target trajectory of an object to be moved. The systems may further cause the object to move along the target trajectory of the object based on one or more motion parameters of the object during the movement of the object. The one or more motion parameters of the object may include a pose parameter, an acceleration parameter, a speed parameter, or the like, or any combination thereof. In some embodiments, for each target trajectory point on the target trajectory, the systems may adjust one or more current motion parameters of the target trajectory point according to one or more motion adjustment parameters to obtain one or more adjusted motion parameters (e.g., an adjusted pose, an adjusted acceleration, and/or an adjusted speed) of the target trajectory point. Further, the systems may cause the object to move from the target trajectory point to the next target trajectory point according to the one or more adjusted motion parameters of the target trajectory point. Compared with the conventional approach, the systems and methods of the present disclosure may adjust/optimize the pose, acceleration, and speed synchronously, thereby improving the efficiency of the motion of the robot. Moreover, accurate motion adjustment parameter(s) of each target trajectory point can be determined using a motion parameter determination model, thereby improving the accuracy of the motion of the robot.

Figure 1:
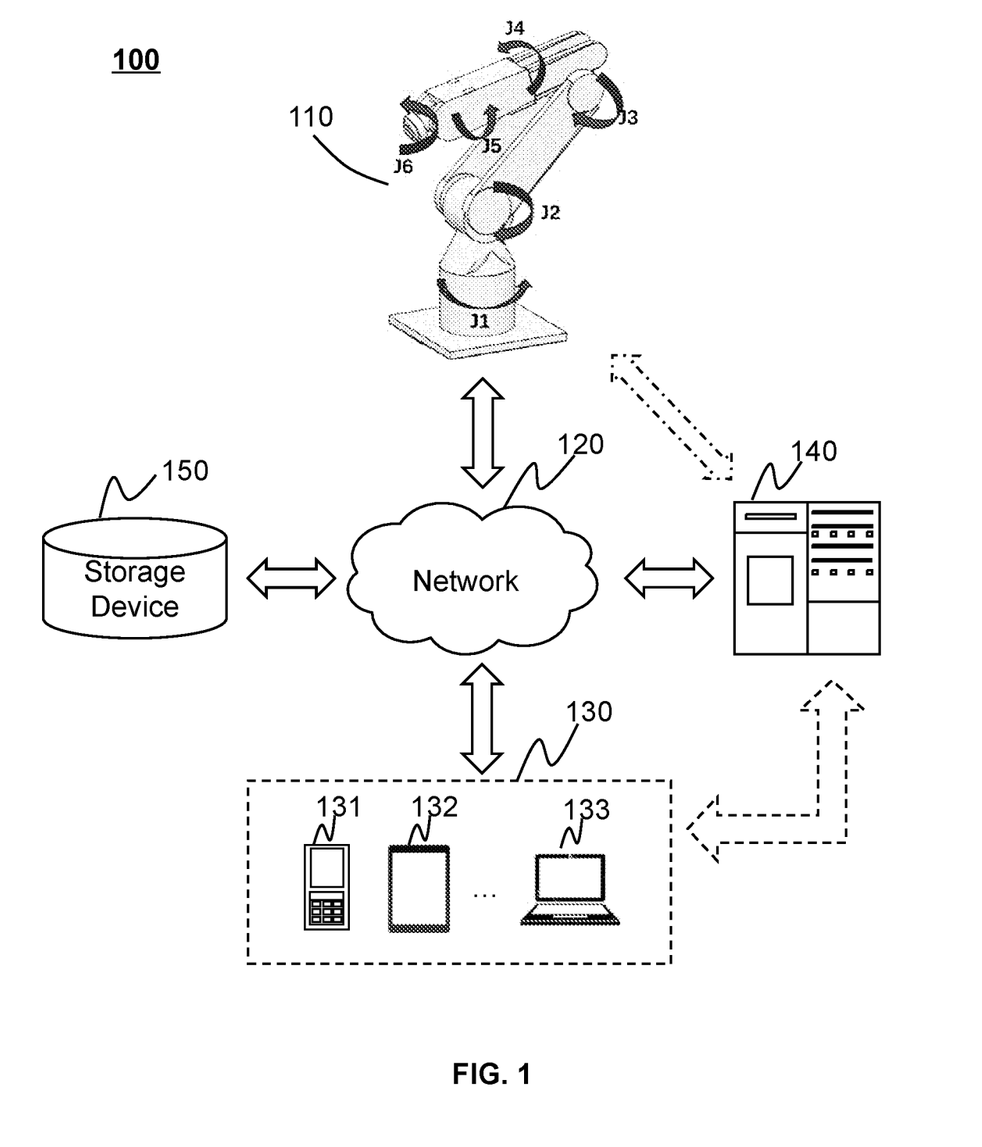
FIG. 1 is a schematic diagram illustrating an exemplary motion control system according to some embodiments of the present disclosure.

FIG. 1 is a schematic diagram illustrating an exemplary motion control system 100 according to some embodiments of the present disclosure. As shown in FIG. 1, the motion control system 100 may include a robot 110, a network 120, one or more terminals 130, a processing device 140, and a storage device 150. In some embodiments, the robot 110, the terminal(s) 130, the processing device 140, and/or the storage device 150 may be connected to and/or communicate with each other via a wireless connection (e.g., the network 120), a wired connection, or a combination thereof. The connection between the components of the motion control system 100 may be variable.

The robot 110 may be installed or fixed at a location and perform a task by moving one or more components of the robot 100. For example, the robot 110 may be an industrial robot for production work. The robot 110 may include one or more movable axes each of which has a degree of freedom of motion. In some embodiments, the robot 110 may be a multi-axis robot. For example, the robot 110 may be a four-axis robot, a six-axis robot, a seven-axis robot, or the like. The robot 100 may implement operations such as assembly and transportation along various trajectories or angles through a combination of motions of the one or more movable axes. Each movable axis of the robot 110 may have a pose parameter, which may indicate a position of the movable axis. For example, as shown in FIG. 1, the robot 110 may be a six-axis robot and include pose parameters J1, J2, J3, J4, J5, and J6 corresponding to six movable axes respectively. It should be noted that the robot 110 described below is merely provided for illustration purposes, and not intended to limit the scope of the present disclosure.

The network 120 may include any suitable network that can facilitate the exchange of information and/or data for the motion control system 100. In some embodiments, one or more components of the motion control system 100 (e.g., the robot 110, the processing device 140, the storage device 150, the terminal(s) 130) may communicate information and/or data with one or more other components of the motion control system 100 via the network 120. For example, the processing device 140 may obtain pose parameters from the storage device 150 via the network 120.

The terminal(s) 130 may be connected to and/or communicate with the robot 110, the processing device 140, and/or the storage device 150. For example, the terminal(s) 130 may receive a user instruction to determine a target trajectory of the robot 110. As another example, the terminal(s) 130 may display a motion trajectory of the robot 110. In some embodiments, the terminal(s) 130 may include a mobile device 131, a tablet computer 132, a laptop computer 133, or the like, or any combination thereof. In some embodiments, the terminal(s) 130 may be part of the processing device 140.

The processing device 140 may process data and/or information obtained from the robot 110, the storage device 150, the terminal(s) 130, or other components of the motion control system 100. For example, the processing device 140 may obtain a target trajectory from the robot 110 or the storage device 150. Further, the processing device 140 may cause the object to move along the target trajectory of the object based on one or more motion parameters of the object during the movement of the object.

In some embodiments, the processing device 140 may be a single server or a server group. In some embodiments, the processing device 140 may be local to or remote from the motion control system 100. Merely for illustration, only one processing device 140 is described in the motion control system 100. However, it should be noted that the motion control system 100 in the present disclosure may also include multiple processing devices. Thus operations and/or method steps that are performed by one processing device 140 as described in the present disclosure may also be jointly or separately performed by the multiple processing devices.

For example, if in the present disclosure the processing device 140 of the motion control system 100 executes both process A and process B, it should be understood that the process A and the process B may also be performed by two or more different processing devices jointly or separately in the motion control system 100 (e.g., a first processing device executes process A and a second processing device executes process B, or the first and second processing devices jointly execute processes A and B). Merely by way of example, one processing device may be configured to apply one or more machine learning models (e.g., the motion parameter determination model), and another processing device may be configured to generate the one or more machine learning models (e.g., the motion parameter determination model).

The storage device 150 may store data, instructions, and/or any other information. In some embodiments, the storage device 150 may store data obtained from the processing device 140, the terminal(s) 130, and/or the robot 110. For example, the storage device 150 may store one or more target trajectories of the robot 110. As another example, the storage device 130 may store one or more target motion parameters of the robot 110 corresponding to target trajectory points on the one or more target trajectories. In some embodiments, the storage device 150 may store data and/or instructions that the processing device 140 may execute or use to perform exemplary methods described in the present disclosure.

It should be noted that the above description of the motion control system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the motion control system 100 may include one or more additional components. Additionally or alternatively, one or more components of the motion control system 100 described above may be omitted. As another example, two or more components of the motion control system 100 may be integrated into a single component.

Figure 2:
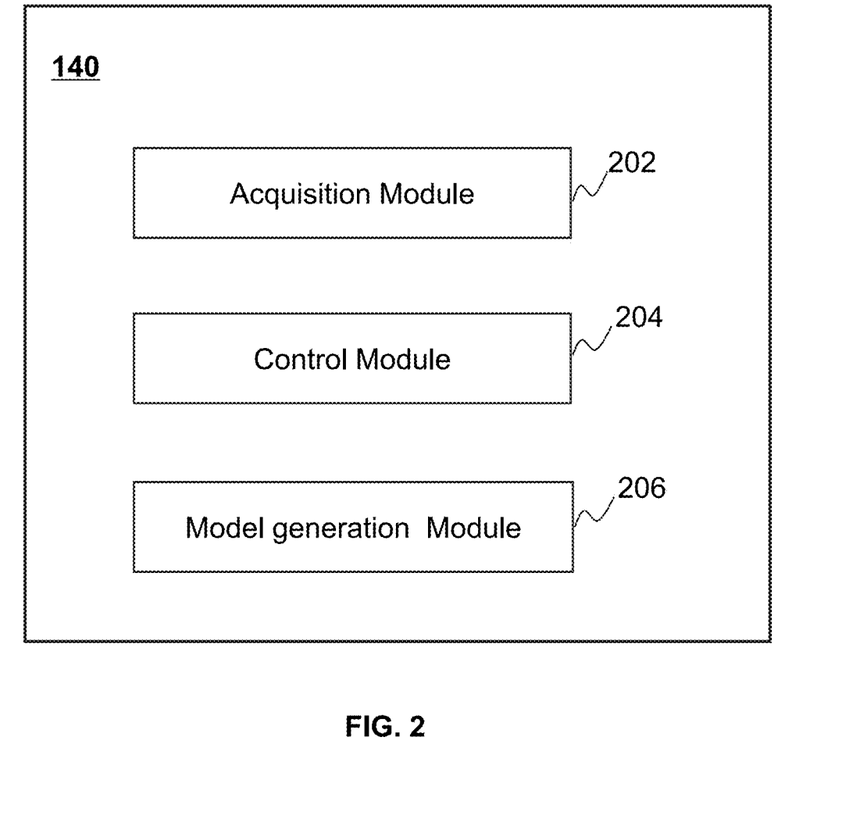
FIG. 2 is a block diagram illustrating an exemplary processing device according to some embodiments of the present disclosure.

FIG. 2 is a block diagram illustrating an exemplary processing device 140 according to some embodiments of the present disclosure.

As shown in FIG. 2, the processing device 140 may include an acquisition module 202, a control module 204, and a model generation module 206. As described in FIG. 1, the motion control system 100 in the present disclosure may also include multiple processing devices, and the acquisition module 202, the control module 204, or the model generation module 206 may be components of different processing devices. For example, the acquisition module 202 and the control module 204 may be components of a processing device 140 A, and model generation module 206 may be a component of a processing device 140B.

The acquisition module 202 may be configured to obtain information relating to the motion control system 100. For example, the acquisition module 202 may obtain a target trajectory of an object to be moved. As used herein, the object may be installed or fixed at a location and may include one or more movable components. A motion (or movement) of the object refers to a motion (or movement) of the one or more movable components. For example, the object may be a robot (e.g., the robot 110 described in FIG. 1). More descriptions regarding the obtaining of the target trajectory may be found elsewhere in the present disclosure. See, e.g., operation 302 in FIG. 3, and relevant descriptions thereof.

The control module 204 may be configured to cause the object to move along the target trajectory of the object based on one or more motion parameters of the object during the movement of the object. In some embodiments, the one or more motion parameters of the object may include a pose parameter, an acceleration parameter, a speed parameter, or the like, or any combination thereof. More descriptions regarding the causing the object to move along the target trajectory of the object based on one or more motion parameters of the object during the movement of the object may be found elsewhere in the present disclosure. See, e.g., operation 304 in FIG. 3, and relevant descriptions thereof.

The model generation module 206 may be configured to obtain data used to train a motion parameter determination model, disclosed in the present disclosure. For example, the acquisition module 410 may be configured to obtain one or more groups of training samples and a preliminary model. The model generation module 206 may be also configured to generate the motion parameter determination model by training the preliminary model using the one or more groups of training samples. More descriptions regarding the generation of the motion parameter determination model may be found elsewhere in the present disclosure (e.g., FIG. 4, and relevant descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, any one of the modules may be divided into two or more units. For instance, the acquisition module 202 may be divided into two units configured to acquire different data. In some embodiments, the processing device 140 may include one or more additional modules, such as a storage module (not shown) for storing data.

Figure 3:
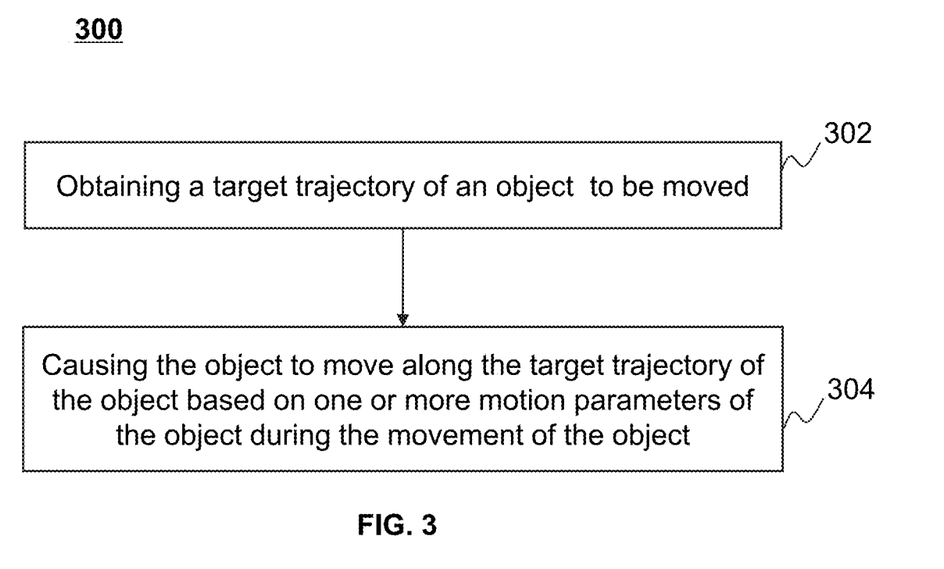
FIG. 3 is a flowchart illustrating an exemplary process for motion control according to some embodiments of the present disclosure.

FIG. 3 is a flowchart illustrating an exemplary process 300 for motion control according to some embodiments of the present disclosure. In some embodiments, process 300 may be executed by the motion control system 100. For example, the process 300 may be implemented as a set of instructions (e.g., an application) stored in a storage device (e.g., the storage device 150). In some embodiments, the processing device 140 (one or more modules illustrated in FIG. 2) may execute the set of instructions and may accordingly be directed to perform the process 300. The operations of the illustrated process presented below are intended to be illustrative. In some embodiments, the process 300 may be accomplished with one or more additional operations not described and/or without one or more of the operations discussed. Additionally, the order of the operations of process 300 illustrated in FIG. 3 and described below is not intended to be limiting.

In 302, the processing device 140 (e.g., the acquisition module 202) may obtain a target trajectory of an object to be moved.

As used herein, the object may be installed or fixed at a location and may include one or more movable components. A motion (or movement) of the object refers to a motion (or movement) of the one or more movable components. For example, the object may be a robot (e.g., the robot 110 described in FIG. 1). For illustration purposes, a motion control of an industrial robot (e.g., a six-axis industrial robot) is described hereinafter. The industrial robot may include one or more movable axes. The motion (or movement) of the industrial robot refers to motions (or movements) of the one or more movable axes.

In some embodiments, the target trajectory of the object refers to a trajectory along which the object needs to move for a purpose (e.g., performing a task). In some embodiments, the target trajectory may be previously generated and stored in a storage device (e.g., the storage device 150 or an external source). The processing device 140 may retrieve the target trajectory directly from the storage device.

In 304, the processing device 140 (e.g., the control module 204) may cause the object to move along the target trajectory of the object based on one or more motion parameters of the object during the movement of the object.

In some embodiments, the one or more motion parameters of the object may include a pose parameter, an acceleration parameter, a speed parameter, or the like, or any combination thereof. Each of the one or more movable axes may have a pose parameter, an acceleration parameter, and a speed parameter. In some embodiments, the pose parameters may indicate positions of the one or more movable axes. For example, the pose parameter corresponding to a movable axis may be represented by coordinates of the movable axis in a coordinate system (e.g., a three-dimensional coordinate system). As another example, the pose parameter of the object may be represented by a rotation matrix J (e.g., a rotation matrix (J1, J2, J3, J4, J5, J6) shown in FIG. 1) indicating positions of the one or more movable axes.

In some embodiments, the target trajectory of the object may include a plurality of target trajectory points. The plurality of target trajectory points may be set manually by a user (e.g., an engineer) or a default setting of the motion control system 100, or determined by the processing device 140 according to an actual need.

In some embodiments, each target trajectory point may have or correspond to one or more current motion parameters, one or more target motion parameters, and one or more motion adjustment parameters. The one or more current motion parameters refer to one or more actual motion parameters of the object when the object moves to the target trajectory point. In some embodiments, the one or more current motion parameters may include a current pose, a current acceleration, a current speed, or the like, or any combination thereof. The one or more target motion parameters refer to one or more motion parameters expected to be achieved when the object moves to the target trajectory point. In some embodiments, the one or more target motion parameters may include a target pose. Alternatively or additionally, the one or more target motion parameters may include a target acceleration, a target speed, etc. The one or more motion adjustment parameters may indicate one or more changes in the one or more current motion parameters of the object. In some embodiments, the one or more motion adjustment parameters may include a pose adjustment, an acceleration adjustment, a speed adjustment, or the like, or any combination thereof.

In some embodiments, the processing device 140 may cause the object to move along the target trajectory of the object based on the one or more current motion parameters, the one or more target motion parameters, and/or the one or more motion adjustment parameters corresponding to each target trajectory point. For illustration purposes, a motion from a first target trajectory point to a second target trajectory point next to the first target trajectory point is described hereinafter. In particular, the processing device 140 may obtain one or more current motion parameters of the object corresponding to the first target trajectory point and one or more target motion parameters corresponding to the second target trajectory point next to the first target trajectory point. In some embodiments, the one or more current motion parameters may be captured by one or more measurement apparatuses. For example, the current acceleration and the current speed may be captured via an acceleration sensor and a speed sensor, respectively. As another example, the current pose may be captured via a laser radar. The processing device 140 may directly obtain the one or more current motion parameters of the object corresponding to the first target trajectory point from the one or more measurement apparatuses. In some embodiments, the one or more target motion parameters corresponding to each target trajectory point may be previously generated and stored in a storage device (e.g., the storage device 150 or an external source). The processing device 140 may retrieve the one or more target motion parameters corresponding to the second target trajectory point directly from the storage device.

The processing device 140 may determine the one or more motion adjustment parameters of the first target trajectory point using a motion parameter determination model based on the one or more current motion parameters and the one or more target motion parameters. The motion parameter determination model may be a trained model (e.g., a machine learning model) used for determining one or more motion adjustment parameters of a target trajectory point. Merely by way of example, the one or more current motion parameters and the one or more target motion parameters may be input into the motion parameter determination model, and the motion parameter determination model may output the one or more motion adjustment parameters. For example, the current pose, the current acceleration, and the current speed of the first target trajectory point, and the target pose of the second target trajectory point may be input into the motion parameter determination model, and the motion parameter determination model may output the pose adjustment, the acceleration adjustment, the speed adjustment of the target trajectory point. Since the motion parameter determination model may learn the optimal mechanism for motion parameter determination based on a large amount of data, the one or more motion adjustment parameters determined using the motion parameter determination model may be relatively accurate. In some embodiments, the motion parameter determination model may include a deep learning model, such as a deep deterministic policy gradient (DDPG) model, a graph neural network(GNN) model, a graph convolution neural network(GCNN) model, a graph recurrent neural network(GRNN) model, etc.

In some embodiments, the processing device 140 may obtain the motion parameter determination model from one or more components of the motion control system 100 (e.g., the storage device 150 or an external source via a network (e.g., the network 120). For example, the motion parameter determination model may be previously trained by a computing device (e.g., the processing device 140 or a computing device of a vendor of the motion parameter determination model), and stored in a storage device (e.g., the storage device 150) of the motion control system 100. The processing device 140 may access the storage device and retrieve the motion parameter determination model. In some embodiments, the motion parameter determination model may be generated according to a machine learning algorithm. More descriptions regarding the generation of the motion parameter determination model may be found elsewhere in the present disclosure (e.g., FIG. 4 and the descriptions thereof).

Further, the processing device 140 may cause the object to move from the first target trajectory point to the second target trajectory point based on the one or more motion adjustment parameters. Specifically, the processing device 140 may adjust the one or more current motion parameters of the first target trajectory point according to the one or more motion adjustment parameters to obtain one or more adjusted motion parameters of the first target trajectory point. Further, the processing device 140 may cause the object to move from the first target trajectory point to the next target trajectory point according to the one or more adjusted motion parameters of the first target trajectory point. For example, the processing device 140 may respectively adjust the current pose, the current acceleration, and the current speed according to the pose adjustment, the acceleration adjustment, the speed adjustment output by the motion parameter determination model to obtain the adjusted pose, the adjusted acceleration, and the adjusted speed of the target trajectory point. Then, the processing device 140 may cause the object to move from the first target trajectory point to the second target trajectory point according to the adjusted pose, the adjusted acceleration, and the adjusted speed.

As described elsewhere in the present disclosure, conventional motion control approach for a robot usually only involves position (or pose) adjustment (or optimization) during motion of the robot or usually adjust/optimize a pose of the robot first, and then adjust/optimize the acceleration after the pose is adjusted/optimized, which has a limited accuracy and efficiency. According to some embodiments of the present disclosure, for each target trajectory point on the target trajectory, the processing device 140 may adjust one or more current motion parameters of the target trajectory point according to one or more motion adjustment parameters to obtain one or more adjusted motion parameters (e.g., an adjusted pose, an adjusted acceleration, and/or an adjusted speed) of the target trajectory point. Further, the processing device 140 may cause the object to move from the target trajectory point to the next target trajectory point according to the one or more adjusted motion parameters of the target trajectory point. Compared with the conventional motion control approach, some embodiments of the present disclosure may adjust/optimize the pose, acceleration, and speed synchronously, thereby improving the efficiency of the motion of the robot. Moreover, the one or more accurate motion adjustment parameters of each target trajectory point can be determined using the motion parameter determination model, thereby improving the accuracy of the motion of the robot.

Figure 4:
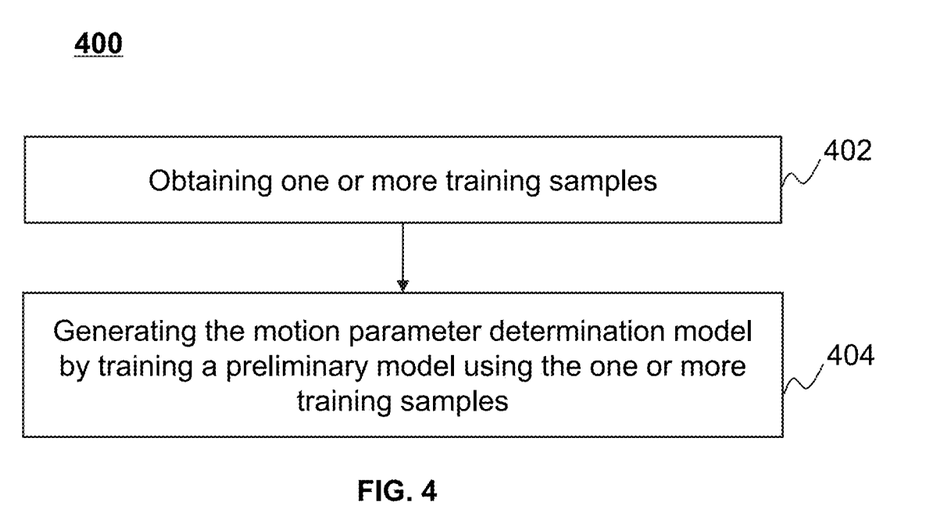
FIG. 4 is a flowchart illustrating an exemplary process for generating a motion parameter determination model according to some embodiments of the present disclosure.

FIG. 4 is a flowchart illustrating an exemplary process 400 for generating a motion parameter determination model according to some embodiments of the present disclosure. In some embodiments, process 400 may be executed by the motion control system 100. For example, the process 400 may be implemented as a set of instructions (e.g., an application) stored in a storage device (e.g., the storage device 150). In some embodiments, the processing device 140 (one or more modules illustrated in FIG. 2) may execute the set of instructions and may accordingly be directed to perform the process 400. The operations of the illustrated process presented below are intended to be illustrative. In some embodiments, the process 400 may be accomplished with one or more additional operations not described and/or without one or more of the operations discussed. Additionally, the order of the operations of process 400 illustrated in FIG. 4 and described below is not intended to be limiting. In some embodiments, the motion parameter determination model described in FIG. 3 may be generated according to process 400 described in FIG. 4.

In 402, the processing device 140 (e.g., the model generation module 206) may obtain one or more groups of training samples.

In some embodiments, each group of training samples may include one or more training samples. Each training sample may include one or more sample current motion parameters of a sample object corresponding to a first sample trajectory point, one or more sample target motion parameters of the sample object corresponding to a second sample trajectory point next to the first sample trajectory point, one or more sample motion adjustment parameters of the sample object, a sample reward corresponding to the first sample trajectory point, and sample information relating to a sample trajectory. In some embodiments, the sample object may be the same as or similar to the object described in FIG. 3. For example, the sample object may be installed or fixed at a location and may include one or more sample movable components. A motion (or movement) of the sample object refers to a motion (or movement) of the one or more sample movable components. The sample trajectory may be a trajectory of a sample motion of the sample object on which the first sample trajectory point is located. In some embodiments, the sample trajectory may be a trajectory of a sample motion of the sample object on which the first sample trajectory point and the second sample trajectory point are located. The one or more sample motion adjustment parameters of the sample object may indicate one or more changes in the one or more sample current motion parameters of the sample object.

In some embodiments, the one or more sample current motion parameters corresponding to the first sample trajectory point, the one or more sample target motion parameters corresponding to the second sample trajectory point, and the one or more sample motion adjustment parameters corresponding to the first sample trajectory point may be similar to the one or more current motion parameters corresponding to the first target trajectory point, the one or more target motion parameters corresponding to the second target trajectory point, and the one or more sample motion adjustment parameters corresponding to the first target trajectory point, respectively. For example, the one or more sample current motion parameters may include a sample current pose, a sample current acceleration, a sample current speed, or the like, or any combination thereof. The one or more sample target motion parameters may include a sample target pose, a sample target acceleration, a sample target speed, or the like, or a combination thereof. For example, the sample target motion parameter(s) may include the sample target pose. The one or more sample motion adjustment parameters may include a sample pose adjustment, a sample acceleration adjustment, a sample speed adjustment, or the like, or any combination thereof.

In some embodiments, at least a portion of the one or more training samples may be previously generated and stored in a storage device (e.g., the storage device 150 or an external source). The processing device 140 may retrieve at least the portion of the one or more training samples directly from the storage device.

In some embodiments, the processing device 140 may generate at least a portion of the one or more training samples. For example, the processing device 140 may obtain a plurality of reference trajectory points of one or more reference motions of a reference object from a sample pool. For each reference trajectory point of the plurality of reference trajectory points, the processing device 140 may obtain one or more reference motion parameters and one or more reference motion adjustment parameters of the reference object corresponding to the reference trajectory point. The one or more reference motion adjustment parameters may indicate one or more changes in the one or more reference motion parameters. Further, the processing device 140 may generate an experience replay pool based on the one or more reference motion parameters and the one or more reference motion adjustment parameters corresponding to each reference trajectory point. Then, the processing device 140 may generate at least the portion of the one or more training samples based on the experience replay pool. More descriptions regarding the generation of the one or more training samples may be found elsewhere in the present disclosure (e.g., FIG. 5 and the descriptions thereof).

In 404, the processing device 140 (e.g., the model generation module 206) may generate the motion parameter determination model by training a preliminary model using the one or more groups of training samples.

The preliminary model refers to a model to be trained. In some embodiments, the processing device 140 may obtain the preliminary model from one or more components of the motion control system 100 or an external source (e.g., a database of a third-party) via a network. The preliminary model may include a plurality of model parameters. Before training, the model parameters of the preliminary model may have their respective initial values. For example, the processing device 140 may initialize parameter values of the model parameters of the preliminary model.

In some embodiments, the preliminary model may be of any type of model (e.g., a machine learning model) as described elsewhere in this disclosure (e.g., FIG. 3 and the relevant descriptions). In some embodiments, the preliminary model may include an action network and/or a critic network. The action network may be configured to generate one or more motion adjustment parameters indicating one or more changes of one or more motion parameters. The critic network may be configured to generate a reward (also referred to as an assessment) for the one or more motion adjustment parameters output by the action network. In some embodiments, the preliminary model may be a DDPG model. For illustration purposes, the training of a DDPG model is described hereinafter. The DDPG model may include a first critic network, a first action network, a second critic network, and a second action network. In some embodiments, at least one of the first critic network, the first action network, the second critic network, or the second action network may be a fully connected neural network.

In some embodiments, the training of the preliminary model may include one or more iterations. Each group of training samples may be used in at least one of the one or more iterations. In some embodiments, a same group or different groups of training samples may be used in different iterations in training the preliminary model. For illustration purposes, the implementation of a current iteration is described hereinafter. For the convenience of descriptions, a group of training samples used in the current iteration is referred to as a target group of training samples, and each training sample in the target group of training samples is referred to as a target training sample.

Merely by way of example, in the current iteration, for each target training sample in the target group of training samples, the one or more sample current motion parameters corresponding to the first sample trajectory point, the one or more sample target motion parameters (also referred to as the one or more first sample target motion parameters) corresponding to the second sample trajectory point in the target training sample may be input into the first action network, and the first action network may output one or more first predicted motion adjustment parameters corresponding to the target training sample. For example, the sample current pose, the sample current acceleration, the sample current speed, and the first sample target pose in the target training sample may be input into the first action network, and the first action network may output a first predicted pose adjustment, a first predicted acceleration adjustment, and a first predicted speed adjustment corresponding to the target training sample. Then, the one or more sample motion adjustment parameters and the one or more sample current motion parameters in the target training sample may be input into the first critic network, and the first critic network may output a first assessment corresponding to the target training sample.

In some embodiments, the sample trajectory includes a plurality of initial trajectory points, and the first sample trajectory point may be one of the plurality of initial trajectory points. In some embodiments, each of the plurality of initial trajectory points may correspond to an initial target trajectory point. As used herein, an initial target trajectory point corresponding to an initial trajectory point refers to an expected position when the sample object moves to the initial trajectory point. More descriptions regarding the initial trajectory points and initial target trajectory points may be found elsewhere in the present disclosure (e.g., FIG. 5 and the descriptions thereof).

In some embodiments, the processing device 140 may designate an initial target trajectory point corresponding to the initial trajectory point next to the second sample trajectory point as a third sample trajectory point. The processing device 140 may obtain one or more second sample target motion parameters of the sample object corresponding to the third sample trajectory point. The one or more first sample target motion parameters and the one or more second sample target motion parameters may be input into the second action network, and the second action network may output one or more second predicted motion adjustment parameters corresponding to the target training sample. For example, the first sample target pose, the first sample target acceleration, the first sample target speed, and the second sample target pose may be input into the second action network, and the second action network may output a second predicted pose adjustment, a second predicted acceleration adjustment, and a second predicted speed adjustment corresponding to the target training sample.

Further, the one or more second predicted motion adjustment parameters and the one or more first sample target motion parameters may be input into the second critic network, and the second critic network may output a second assessment corresponding to the target training sample.

In some embodiments, a reference assessment corresponding to the target training sample may be determined based on the second assessment and the sample reward. For example, the reference assessment corresponding to the target training sample may be determined according to Equation (1) as below:

$$y_j = r_{j+1} + \gamma Q'(s_{j+1}, \pi'(s_{j+1} | \theta_{\pi'}) | \theta_{Q'}), \quad (1)$$

where j denotes a serial number of the target training sample, $y_j$ denotes the reference assessment corresponding to the target training sample, $r_{j+1}$ denotes the sample reward, $\gamma$ denotes an attenuation factor, $s_{j+1}$ denotes the one or more first sample target motion parameters, $\theta_{\pi'}$ denotes parameters of the second action network, $\pi'(s_{j+1}|\theta_{\pi'})$ denotes the one or more second predicted motion adjustment parameters output by the second action network, $\theta_{\pi'}$ denotes parameters of the second critic network, and $Q'(s_{j+1}, \pi'(s_{j+1}|\theta_{\pi'})|\theta_{Q'})$ denotes the second assessment output by the second critic network.

In some embodiments, after the training of the target group of training samples is completed, the processing device 140 may determine a value of a first loss function based on the first assessment and the reference assessment corresponding to each target training sample in the target group of training samples. The first loss function may be used to measure a discrepancy between the first assessment output by the first critic network and the reference assessment in an iteration. Exemplary first loss functions may include a squared error loss function, a square loss function, a focal loss function, a log loss function, a cross-entropy loss, a Dice ratio, or the like.

For example, the processing device 140 may determine the value of the first loss function according to Equation (2) as below:

$$\text{Loss1} = \frac{1}{N}\sum_{j=1}^{j=N}(y_j - Q(s_j, a_j | \theta_Q))^2, \quad (2)$$

where Loss1 denotes the value of the first loss function, N denotes a count of the target training samples in the target group of training samples, $s_j$ denotes the one or more sample current motion parameters, $a_j$ denotes the one or more sample motion adjustment parameters, $\theta_Q$ denotes parameters of the first critic network, and $Q(s_j, a_j|\theta_Q)$ denotes the first assessment output by the first critic network.

Then, the processing device 140 may determine a value of a second loss function in the current iteration based on the one or more current motion parameters and the one or more first predicted motion adjustment parameters corresponding to each target training sample in the target group of training samples. For example, the processing device 140 may input the one or more current motion parameters and the one or more first predicted motion adjustment parameters corresponding to each target training sample to the first critic network, and the first critic network may output the value of the second loss function corresponding to the target training sample. Further, the processing device 140 may determine an average of the values of the second loss function corresponding to the target training samples in the target group of training samples as the value of the second loss function in the current iteration.

The processing device 140 may then determine an assessment result of an intermediate preliminary model based on the values of the first loss function and the second loss function. If the current iteration is the first iteration, the intermediate preliminary model may be the preliminary model. If the current iteration is an iteration other than the first iteration, the intermediate preliminary model may be an updated preliminary model generated in a previous iteration. The assessment result may indicate whether the intermediate preliminary model is sufficiently trained. For example, the processing device 140 may determine whether a termination condition is satisfied in the current iteration based on the values of the first loss function and the second loss function. Exemplary termination conditions may be that the values of the first loss function and the second loss function in the current iteration are respectively smaller than a first threshold value and a second threshold value, a first difference between the values of the first loss function obtained in a previous iteration and the current iteration and a second difference between the values of the second loss function obtained in a previous iteration and the current iteration are respectively smaller than a first certain threshold and a first certain threshold, a maximum number (or count) of iterations has been performed, or the like, or any combination thereof.

In response to determining that the termination condition is not satisfied in the current iteration, the processing device 140 may determine that the intermediate preliminary model is not sufficiently trained, and further update the intermediate preliminary model based on the first loss function and the second loss function. Merely by way of example, the processing device 140 may update at least some of the parameter values of the first critic network and the first action network of the intermediate preliminary model according to, for example, a backpropagation algorithm, a gradient descent algorithm, etc. For example, the processing device 140 may determine a gradient of the second loss function according to Equation (3) as below:

$$\nabla_{\theta_\pi} \text{Loss2} = \frac{1}{N} \sum_{j=1}^{j=N} \nabla_a Q''(s, a \mid \theta_Q) \mid_{s=s_j, a=\pi(s_j \mid \theta_\pi)} \nabla_{\theta_\pi} \pi(s \mid \theta_\pi) \mid_{s_j}, \quad (3)$$

where Loss2 denotes the second loss function, $\theta_\pi$ denotes parameters of the first action network, $\nabla_{\theta_\pi}$Loss2 denotes the gradient of the second loss function to $\theta_\pi$, $\pi(s_j|\theta_\pi)$ denotes the output of the first action network (i.e., the one or more first predicted motion adjustment parameters output by the first action network), $Q''(s, a|\theta_Q)|_{s=s_j,a=\pi(s_j)}$ denotes the second loss function, $\nabla_a Q''(s, a|\theta_Q)|_{s=s_j,a=\pi(s_j)}$ denotes a gradient of the second loss function to the output of the first action network, and $\nabla_{\theta_\pi}\pi(s|\theta_r)|_{s_j}$ denotes a gradient of the output of the first action network to $\theta_\pi$.

Further, the processing device 140 may update at least some of the parameter values of the first action network of the intermediate preliminary model according to Equation (4) as below:

$$\theta'_\pi = \theta_\pi - \eta \nabla_{\theta_\pi} \text{Loss2} \quad (4)$$

where $\theta_\pi'$ denotes the updated parameters of the first action network, η denotes a step factor (e.g., 0.05).

After the at least some of the parameter values of the first critic network and the first action network are updated, the processing device 140 may further perform a next iteration until the termination condition is satisfied. In some embodiments, after the first critic network and the first action network are continuously updated for a certain number of times, the processing device 140 may update parameters of the second critic network and the second action network. For example, the processing device 140 may directly replace the parameters of the second critic network with the latest updated parameters of the first critic network, and replace the parameters of the second action network with the latest updated parameters of the first action network.

In response to determining that the termination condition is satisfied in the current iteration, the processing device 140 may determine that the intermediate preliminary model is sufficiently trained and terminate the training process. The intermediate preliminary model may be designated as the motion parameter determination model.

In some embodiments, after the training of each target training sample is completed, the processing device 140 may update the one or more sample target motion parameters and the sample reward based on the one or more sample current motion parameters and the one or more first predicted motion adjustment parameters. More descriptions regarding the one or more sample target motion parameters and the reward may be found elsewhere in the present disclosure (e.g., FIG. 5 and the descriptions thereof). Then, the processing device 140 may designate the one or more updated sample target motion parameters, the updated sample reward, the one or more sample current motion parameters, the one or more first predicted motion adjustment parameters, and sample information relating to an updated sample trajectory as a new training sample.

Figure 5:
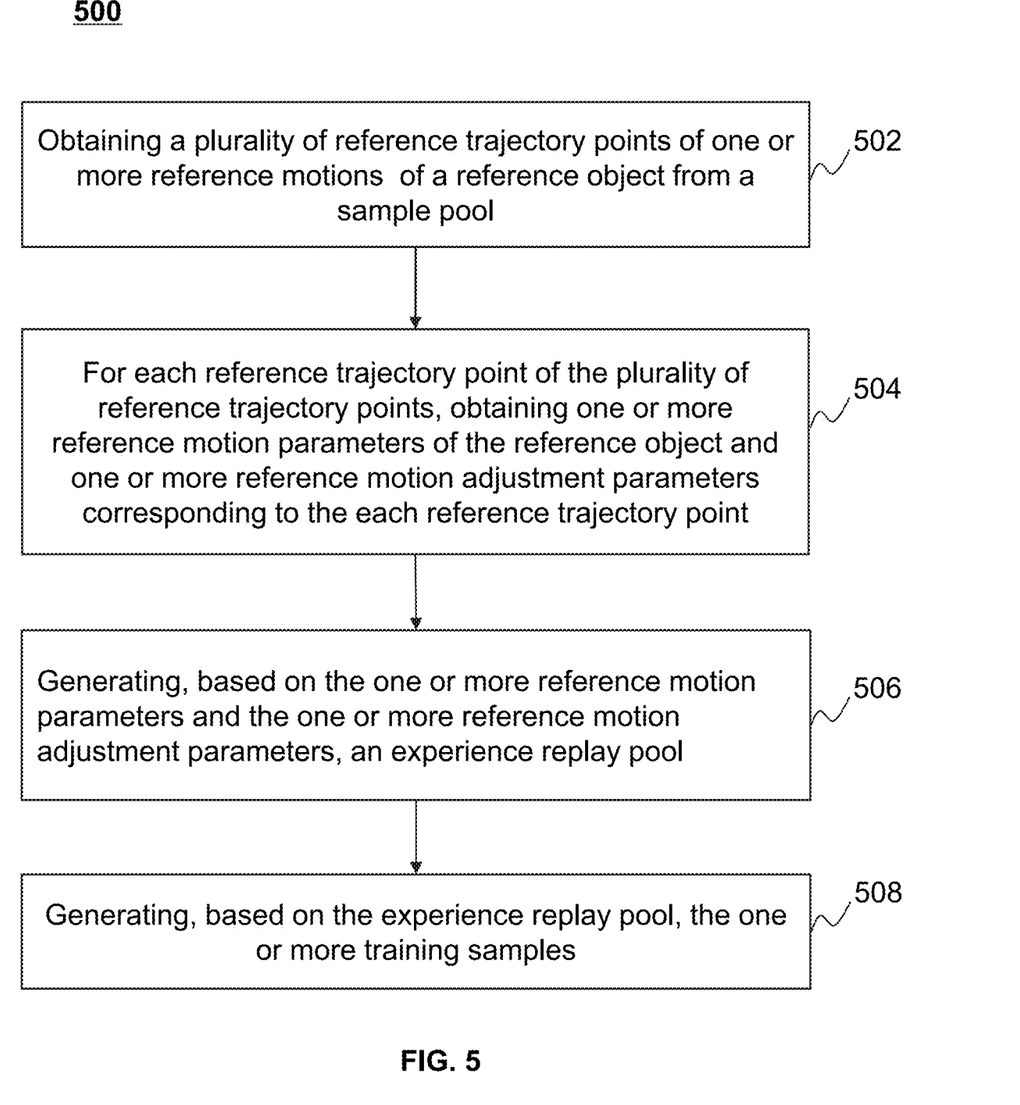
FIG. 5 is a flowchart illustrating an exemplary process for generating one or more groups of training samples according to some embodiments of the present disclosure.

FIG. 5 is a flowchart illustrating an exemplary process 500 for generating one or more groups of training samples according to some embodiments of the present disclosure. In some embodiments, one or more operations of the process 500 may be performed to achieve at least part of operation 402 as described in connection with FIG. 4.

In 502, the processing device 140 (e.g., the model generation module 206) may obtain a plurality of reference trajectory points of a reference object from a sample pool.

In some embodiments, the reference object may be the same as or similar to the object described in FIG. 3. For example, the reference object may be the robot 110 described in FIG. 1. In some embodiments, the sample pool may include initial sample information. In some embodiments, the initial sample information may include information relating to a plurality of initial motions of the reference object. As used herein, an initial motion of the reference object refers to a motion process that the reference object moves from a start point to an end point along an initial trajectory. An initial trajectory may include a plurality of initial trajectory points distributed on the initial trajectory. In some embodiments, the initial sample information may include information relating to one or more initial target trajectories of the reference object. An initial trajectory may correspond to an initial target trajectory. As used herein, an initial target trajectory corresponding to an initial trajectory refers to a trajectory on which the reference object is expected to move when the reference object performs the initial motion corresponding to the initial trajectory. In some embodiments, one or more initial trajectories may correspond to a same initial target trajectory. In some embodiments, each initial trajectory point on an initial trajectory may correspond an initial target trajectory point on the initial target trajectory corresponding to the initial trajectory. As used herein, an initial target trajectory point corresponding to an initial trajectory point refers to an expected position of the reference object when the reference object moves to the initial trajectory point.

In some embodiments, the processing device 140 may randomly select a plurality of initial trajectory points from the sample pool as the plurality of reference trajectory points.

In some embodiments, the processing device 140 may determine a duration of the movement of the reference object between each two adjacent initial trajectory points on each of the plurality of initial trajectories based on information relating to the plurality of initial motions of the reference object. As used herein, the duration of the movement of the reference object between two adjacent initial trajectory points may refer to a time period in which the reference object moves from one of the two adjacent initial trajectory points to another of the two adjacent initial trajectory points. In some embodiments, the information relating to the plurality of initial motions may include arrival time information corresponding to each initial trajectory point on the plurality of initial trajectories. The processing device 140 may determine the duration of the movement of the reference object between each two adjacent initial trajectory points based on the arrival time information corresponding to each initial trajectory point. For example, arrival time information corresponding to each initial trajectory point may include a time point when the reference object arrives at the initial trajectory point. The processing device 140 may determine a time period between a first time point when the reference object arrives at an initial trajectory point A and a second time point when the reference object arrives at an initial trajectory point B as the duration of the movement of the reference object between two adjacent initial trajectory points A and B.

Further, the processing device 140 may determine the reference trajectory points based on the duration of the movement of the reference object between each two adjacent initial trajectory points. For example, the processing device 140 may obtain a plurality of time intervals. Then, the processing device 140 may divide the initial trajectory points into a plurality of point sets each of which corresponds to one of the plurality of time intervals based on the duration of the movement of the reference object between each two adjacent initial trajectory points and the plurality of time intervals. In particular, if the duration of the movement between two adjacent initial trajectory points is within a first time interval of the plurality of time intervals, the two adjacent trajectory points may be divide into a point set corresponding to the first time interval. The plurality of time intervals may be set manually by a user (e.g., an engineer) according to an empirical value or a default setting of the motion control system 100, or determined by the processing device 140 according to an actual need, such as from 0 to 1 second, from 1 second to 2 seconds, from 1 minutes to 2 minutes, etc. The processing device 140 may determine the reference trajectory points from the plurality of point sets. For example, the processing device 140 may select a same number of initial trajectory points from each point set as reference trajectory points. As another example, the processing device 140 may select the reference trajectory points set based on a count of initial trajectory points in each point set. Merely for illustration purposes, if a ratio of a count of initial trajectory points in a point set M to a count of initial trajectory points in a point set N is 2, a ratio of the number of the reference trajectory points from the point set M to the number of the reference trajectory points from the point set N may be 2.

If the count of initial trajectory points in a point set is relatively small, a probability that an initial trajectory point in the point set is selected as a reference trajectory point is relatively small. By selecting one or more initial trajectory points from each point set as the reference trajectory points, the reference trajectory points may cover various ranges of the initial trajectories, which improve the accuracy of the subsequent experience replay pool generated based on the reference trajectory points.

In some embodiments, the processing device 140 may obtain a plurality of candidate trajectory points from the sample pool. In some embodiments, the processing device 140 may determine excluded initial trajectory points from the sample pool. Exemplary excluded initial trajectory points may include an ending trajectory point on an initial trajectory, a motion fault trajectory point, or the like, or any combination thereof. As used herein, a motion fault trajectory point refers to an initial trajectory point on which the initial motion of the reference object does not satisfy a preset condition. Exemplary preset conditions may include that a deviation of the initial trajectory point from the corresponding initial target trajectory point is smaller than a distance threshold, that a speed corresponding to the initial trajectory point is smaller than a speed threshold, that an acceleration corresponding to the initial trajectory point is smaller than an acceleration threshold, etc. The processing device 140 may obtain the plurality of candidate trajectory points from the remaining initial trajectory points other than the excluded initial trajectory points. Further, the processing device 140 may determine the reference trajectory points based on the plurality of candidate trajectory points. For example, the processing device 140 may determine the reference trajectory points from the plurality of candidate trajectory points according to the preset condition(s) mentioned above. In this way, a portion or all of the reference trajectory points may be used for the generation of the subsequent experience replay pool, avoiding re-selection of other reference trajectory points, thereby improving the efficiency of the generation of the subsequent experience replay pool.

In some embodiments, the sample pool may be previously generated and stored in a storage device (e.g., the storage device 150 or an external source). The processing device 140 may retrieve the sample pool directly from the storage device.

In some embodiments, the processing device 140 may generate the sample pool. Merely by way of example, one or more irregular curves along which the reference object is able to move may be generated through various simulation software (e.g., robotStudio). The one or more irregular curves may be designated as the one or more initial target trajectories. Each initial target trajectory may be discretized into a plurality of initial target trajectory points. The processing device 140 may obtain the information relating to the one or more initial target trajectories (e.g., an initial target pose corresponding to each initial target trajectory point). For each of the one or more initial target trajectories, the processing device 140 may cause the reference object to perform one or more initial motions based on the initial target trajectory. For each initial motion, the processing device 140 may cause the reference object to move from a starting point of the initial target trajectory and guide the reference object to pass through the initial target trajectory points on the initial target trajectory in sequence according to an irregular motion control instruction to obtain an initial trajectory including a plurality of initial trajectory points each of which corresponds to one of the initial target trajectory points on the initial target trajectory.

During each initial motion, the processing device 140 may record information relating to the initial motion (also referred to as information relating to the initial trajectory). Exemplary information relating to the initial trajectory may include one or more initial motion parameters corresponding to each initial trajectory point on the initial trajectory, initial motion fault information corresponding to each initial trajectory point, initial duration information of the initial motion, initial trajectory error information corresponding to each initial trajectory point, deviation information between each initial trajectory point on the initial trajectory and the corresponding initial target trajectory point, or the like, or any combination thereof. As used herein, the one or more initial motion parameters corresponding to an initial trajectory point refer to one or more initial motion parameters of the reference object when the reference object moves to the initial trajectory point. In some embodiments, the one or more initial motion parameters may include an initial pose, an initial acceleration, or an initial speed, or the like, or any combination thereof. The initial motion fault information corresponding to an initial trajectory point may indicate whether the initial trajectory point is a motion fault trajectory point. The initial duration information may include a duration that the reference object moves from the starting trajectory point to each initial trajectory point along the initial trajectory. The initial trajectory error information corresponding to an initial trajectory point may include an error or difference between the initial trajectory point and the corresponding initial target trajectory point.

Further, the processing device 140 may generate the sample pool according to the information relating to each initial motion and the information relating to the one or more initial target trajectories. For example, the processing device 140 may designate the information relating to each initial motion and the information relating to the one or more initial target trajectories as the initial sample information.

In some embodiments, the count of the plurality of reference trajectory points may be associated with the initial trajectory error information relating to the initial trajectory points of the plurality of initial motions. For example, the processing device 140 may determine a variance of the error corresponding to the initial trajectory points in the sample pool. If the variance of the trajectory errors is relatively large, the count of the plurality of reference trajectory points may be relatively large.

In 504, for each reference trajectory point of the plurality of reference trajectory points, the processing device 140 (e.g., the model generation module 206) may obtain one or more reference motion parameters of the reference object and one or more reference motion adjustment parameters corresponding to the each reference trajectory point.

In some embodiments, the processing device 140 may directly obtain one or more initial motion parameters of the reference trajectory point from the sample pool, and designate the one or more initial motion parameters as the one or more reference motion parameters.

In some embodiments, the one or more reference motion adjustment parameters may indicate one or more changes in the one or more reference motion parameters. In some embodiments, the one or more reference motion adjustment parameters may be similar to the one or more motion adjustment parameters described in FIG. 3. For example, the one or more reference motion adjustment parameters may include a reference pose adjustment, a reference acceleration adjustment, a reference speed adjustment, or the like, or any combination thereof.

In some embodiments, the one or more reference motion adjustment parameters may satisfy a constraint condition. In some embodiments, the constraint condition may include a constraint condition for the reference speed adjustment and/or the reference acceleration adjustment.

In some embodiments, the constraint condition may be determined by performing a clustering on the initial target motion parameters corresponding to the initial target trajectory points of the one or more initial target trajectories. In some embodiments, the information relating to the one or more initial target trajectories may include one or more initial target motion parameters corresponding to each initial target trajectory point on the one or more initial target trajectories. In some embodiments, the one or more initial target motion parameters corresponding to an initial target trajectory point may be similar to the one or more target motion parameters corresponding to a target trajectory point described in FIG. 3. For example, the one or more initial target motion parameters may include an initial target pose.

Merely by way of example, the processing device 140 may perform a clustering on the initial target poses corresponding to the initial target trajectory points of the one or more initial target trajectories according to a clustering algorithm (e.g., a K-means clustering algorithm) to cluster the initial target trajectory points into a plurality of groups of initial target trajectory points. For each group of initial target trajectory points, the processing device 140 may obtain the remaining initial trajectory points (also referred to as normal trajectory points) other than motion fault trajectory points from the initial trajectory points corresponding to the group of initial target trajectory points. Then, the processing device 140 may obtain a maximum speed, a minimum speed, a maximum acceleration, and a minimum acceleration corresponding to the normal trajectory points. Further, the constraint condition may be determined as that a sum of the reference speed adjustment and the reference speed needs to be within a range from the minimum speed to the maximum speed, and/or a sum of the reference acceleration adjustment and the reference acceleration needs to be within a range from the minimum acceleration to the maximum acceleration.

In some embodiments, the processing device 140 may randomly determine one or more initial motion adjustment parameters. Alternatively, the processing device 140 may determine the one or more initial motion adjustment parameters using an initial action network. In some embodiments, the initial action network may be similar to the action network (e.g., the first action network) described in FIG. 0.3. Merely by way of example, the one or more reference motion parameters and the one or more initial target motion parameters corresponding to an initial target trajectory point corresponding to an initial trajectory point next to the reference trajectory point may be input into the initial action network, and the action network may output the one or more initial motion adjustment parameters.

In some embodiments, a noise may be added to the one or more initial motion adjustment parameters to obtain the reference motion adjustment parameters. In some embodiments, the noise may be a random noise. For example, the noise may be a Gaussian noise, etc.

In 506, the processing device 140 (e.g., the model generation module 206) may generate, based on the one or more reference motion parameters and the one or more reference motion adjustment parameters corresponding to the each reference trajectory point, an experience replay pool.

In some embodiments, for the each reference trajectory point, the processing device 140 may determine one or more reference target motion parameters of the reference object corresponding to a reference target trajectory point based on the one or more reference motion parameters and the one or more reference motion adjustment parameters. For example, the processing device 140 may retrieve the sample pool according to the one or more reference motion parameters and the one or more reference motion adjustment parameters to obtain an initial trajectory point next to the reference trajectory point. Further, the processing device 140 may designate the initial trajectory point next to the reference trajectory point as the reference target trajectory point. Therefore, the one or more initial motion parameters corresponding to the initial trajectory point next to the reference trajectory point may be designated as the one or more reference target motion parameters.

In some embodiments, for the each reference trajectory point, the processing device 140 may determine a reward corresponding to the reference trajectory point. In some embodiments, the processing device 140 may obtain information relating to a reference portion of a reference trajectory based on the one or more reference motion parameters and the one or more reference motion adjustment parameters. The reference trajectory refers to an initial trajectory on which the reference trajectory point and the reference target trajectory point are located. The initial motion corresponding to the reference trajectory may be referred to as a reference motion. The reference portion of the reference trajectory may be from a starting trajectory point of the reference trajectory to the reference target trajectory point. In some embodiments, as described elsewhere in the present disclosure, the reference trajectory may include a plurality of initial trajectory points, and the reference trajectory point may be one of the plurality of initial trajectory points. In some embodiments, the information relating to the reference portion may include reference motion fault information, reference duration information, reference trajectory error information, and reference deviation information. The reference motion fault information may indicate whether there are one or more motion fault trajectory points on the reference portion. The reference duration information may include a duration of the reference motion along the reference portion. The reference trajectory error information may include the error or difference between each initial trajectory point on the reference portion and the corresponding initial target trajectory point. The reference deviation information may include initial deviation information between each of initial trajectory points on the reference portion and the corresponding initial target trajectory point. In some embodiments, the reference deviation information may include a reference count of initial trajectory points that deviate from the corresponding initial target trajectory points by smaller than a distance threshold. In some embodiments, if an initial trajectory point deviates from the corresponding initial target trajectory point by smaller than the distance threshold, the initial trajectory point may be referred to as an arrival point.

In some embodiments, as described elsewhere in the present disclosure, the sample pool may include the information relating to each initial motion, and the processing device 140 may obtain the information relating to the reference motion (or reference trajectory) from the sample pool based on the one or more reference motion parameters and the one or more reference motion adjustment parameters. Further, the processing device 140 may obtain the information relating to the reference portion according to the information relating to the reference motion. For example, the processing device 140 may determine the reference motion fault information according to the initial motion fault information corresponding to each initial trajectory point on the reference portion. As another example, the processing device 140 may determine a duration that the reference object moves from the starting trajectory point to the reference target trajectory point as the reference duration information according to the initial duration information of the reference motion.

Further, the processing device 140 may determine the reward corresponding to the reference trajectory point based on the information relating to the reference portion of the reference trajectory. Merely by way of example, the the processing device 140 may determine the reward corresponding to the reference trajectory point according to Equation (5) as below:

$$R = \alpha K - \beta \sqrt[2]{\left(\sum_{i=1}^{i=m}(Perror_i)^2\right)} - \gamma E - \lambda T, \quad (5)$$

where R denotes the reward corresponding to the reference trajectory point, $\alpha$, $\beta$, $\gamma$, and $\lambda$ denote parameters for normalizing and weighting, K denotes a count of arrival points on the reference portion, i denotes a series number of an initial trajectory point on the reference portion, m denotes a count of the initial trajectory points on the reference portion, $Perror_i$ denotes the error corresponding to the initial trajectory point i, and T denotes the duration corresponding to the reference portion. If the reference motion fault information indicates that there are one or more motion fault trajectory points, E may be equal to 1, if the reference motion fault information indicates that there is no motion fault trajectory point, E may be equal to 0.

In some embodiments, the reference deviation information may include a reference distribution of arrival points on the reference portion. The reward may be associated with the reference distribution. For example, if the reference distribution indicates that the arrival points are relatively concentrated, the reward may be relatively large.

In some embodiments, if the reference motion fault information indicates that there are one or more motion fault trajectory points, the reference motion fault information may include a duration of the movement of the reference object from the starting trajectory point of the reference portion to the earliest motion fault trajectory point. The reward may be associated with the duration of the movement of the reference object from the starting trajectory point to the earliest motion fault trajectory point. For example, if the duration of the movement of the reference object from the starting trajectory point to the earliest motion fault trajectory point is relatively long, the the reward may be relatively large.

In some embodiments, the reward may be associated with a length of the reference trajectory. For example, if the length of the reference trajectory is relatively large, the reward may be relatively large.

Further, the process device 140 may designate the one or more reference motion parameters, the one or more reference target motion parameters, the one or more reference motion adjustment parameters, the reward corresponding to the reference trajectory point, and information relating to the reference trajectory as reference data corresponding to the each reference trajectory point. The processing device 140 may generate the experience replay pool based on the reference data corresponding to the plurality of reference trajectory points, that is, the experience replay pool may include the reference data corresponding to the plurality of reference trajectory points.

In 508, the processing device 140 (e.g., the model generation module 206) may generate, based on the experience replay pool, the one or more groups of training samples.

In some embodiments, the reference data corresponding to one reference trajectory point may be designated one training sample. That is, a training sample may include the one or more reference motion parameters, the one or more reference target motion parameters, the one or more reference motion adjustment parameters, the reward corresponding to the reference trajectory point, and information relating to the reference trajectory. The processing device 140 may randomly select the reference data corresponding to one or more reference trajectory points from the experience replay pool as a group of training samples.

According to some embodiments of the present disclosure, since the information relating to the reference portion may include rich information such as the reference motion fault information, the reference duration information, the reference trajectory error information, and the reference deviation information, the reward corresponding to the reference trajectory point determined based on the information relating to the reference portion may be relatively accurate, thereby the reference data corresponding to the plurality of reference trajectory points may be relatively accurate, that is, the training samples may be accurate.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an subject oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification or determination is provided for illustration purposes and modified according to different situations. For example, a classification condition that "a value is greater than the threshold value" may further include or exclude a condition that "the probability value is equal to the threshold value."

What is claimed is:

1. A system for motion control, comprising: at least one storage device including a set of instructions; and at least one processor in communication with the at least one storage device, wherein when executing the set of instructions, the at least one processor is configured to direct the system to perform operations including: obtaining a target trajectory of an object to be moved; and causing the object to move along the target trajectory of the object based on one or more motion parameters of the object during the movement of the object, wherein at least a portion of the one or more motion parameters of the object are determined using a motion parameter determination model, the one or more motion parameters of the object include a pose parameter, and at least one of an acceleration parameter or a speed parameter, the target trajectory of the object includes a plurality of target trajectory points, and the causing the object to move along the target trajectory of the object based on one or more motion parameters of the object during the movement of the object includes: for each target trajectory point of the plurality of target trajectory points, obtaining one or more current motion parameters of the object corresponding to the target trajectory point and one or more target motion parameters corresponding to a next target trajectory point adjacent to the target trajectory point; determining, based on the one or more current motion parameters and the one or more target motion parameters, one or more motion adjustment parameters of the object using the motion parameter determination model, wherein the one or more motion adjustment parameters indicate one or more changes in the one or more current motion parameters of the object, and the one or more motion adjustment parameters include a pose adjustment of the pose parameter and at least one of an acceleration adjustment of the acceleration parameter or a speed adjustment of the speed parameter; and causing the object to move from the target trajectory point to the next target trajectory point based on the one or more motion adjustment parameters, wherein the motion parameter determination model is generated according to a training process including: obtaining one or more groups of training samples; and generating the motion parameter determination model by training a preliminary model using the one or more groups of training samples, wherein each group of training samples includes one or more training samples, and each training sample of the one or more training samples includes: one or more sample current motion parameters of a sample object corresponding to a first sample trajectory point, one or more sample target motion parameters of the sample object corresponding to a second sample trajectory point, the second sample trajectory point being next to the first sample trajectory point, one or more sample motion adjustment parameters of the sample object indicating one or more changes in the one or more sample current motion parameters of the sample object, a sample reward corresponding to the first sample trajectory point, and sample information relating to a sample trajectory of a sample motion of the sample object on which the first sample trajectory point is located, wherein the one or more groups of training samples are generated by: obtaining a plurality of reference trajectory points of a reference object from a sample pool: for each reference trajectory point of the plurality of reference trajectory points, obtaining one or more reference motion parameters and one or more reference motion adjustment parameters of the reference object corresponding to each reference trajectory point, the one or more reference motion adjustment parameters indicating one or more changes in the one or more reference motion parameters: generating, based on the one or more reference motion parameters and the one or more reference motion adjustment parameters corresponding to each reference trajectory point, an experience replay pool; and generating, based on the experience replay pool, the one or more groups of training samples, wherein the generating, based on the one or more reference motion parameters and the one or more reference motion adjustment parameters corresponding to each reference trajectory point, an experience replay pool includes: for each reference trajectory point, determining, based on the one or more reference motion parameters and the one or more reference motion adjustment parameters, one or more reference target motion parameters of the reference object corresponding to a reference target trajectory point: determining a reward corresponding to the reference trajectory point: designating the one or more reference motion parameters, the one or more reference target motion parameters, the one or more reference motion adjustment parameters, the reward corresponding to the reference trajectory point, and information relating to a reference trajectory on which the reference trajectory point and the reference target trajectory point are located as reference data corresponding to each reference trajectory point: generating, based on the reference data corresponding to the plurality of reference trajectory points, the experience replay pool.

2. The system of claim 1, wherein the determining a reward corresponding to the reference trajectory point includes:

obtaining, based on the one or more reference motion parameters and the one or more reference motion adjustment parameters, information relating to a reference portion of the reference trajectory, wherein the portion of the reference trajectory is from a starting trajectory point of the reference trajectory to the reference target trajectory point; and determining, based on the information relating to the reference portion of the reference trajectory, the reward corresponding to the reference trajectory point.

3. The system of claim 2, wherein the reference trajectory includes a plurality of initial trajectory points, the reference trajectory point is one of the plurality of initial trajectory points, and the information relating to the reference portion includes:

reference motion fault information indicating whether there are one or more motion fault trajectory points on the reference portion, reference duration information corresponding to the reference portion, reference trajectory error information corresponding to the reference portion, and reference deviation information between each of initial trajectory points on the reference portion and an initial target trajectory point corresponding to each of the initial trajectory points.

4. The system of claim 3, wherein the reference deviation information includes at least one of a reference count or a reference distribution of initial trajectory points that deviate from the corresponding initial target trajectory points by smaller than a distance threshold.

5. The system of claim 3, wherein if the reference motion fault information indicates that there are one or more motion fault trajectory points, the reference motion fault information includes a duration of the movement of the reference object from a starting trajectory point of the reference portion to the earliest motion fault trajectory point.

6. The system of claim 1, wherein the reward is positively correlated with a length of the reference trajectory.

7. A method for motion control, implemented on a computing device having at least one processor and at least one storage device, the method comprising:

obtaining a target trajectory of an object to be moved; and causing the object to move along the target trajectory of the object based on one or more motion parameters of the object during the movement of the object, wherein at least a portion of the one or more motion parameters of the object are determined using a motion parameter determination model, the one or more motion parameters of the object include at least one of a pose parameter, an acceleration parameter, or a speed parameter, and the motion parameter determination model is generated based on one or more groups of training samples, the one or more groups of training samples being generated by:

obtaining a plurality of reference trajectory points of a reference object from a sample pool;

for each reference trajectory point of the plurality of reference trajectory points, obtaining one or more reference motion parameters and one or more reference motion adjustment parameters of the reference object corresponding to the reference trajectory point, the one or more reference motion adjustment parameters indicating one or more changes in the one or more reference motion parameters;

determining, based on the one or more reference motion parameters and the one or more reference motion adjustment parameters, one or more reference target motion parameters of the reference object corresponding to a reference target trajectory point;

determining a reward corresponding to the reference trajectory point;

designating the one or more reference motion parameters, the one or more reference target motion parameters, the one or more reference motion adjustment parameters, the reward corresponding to the reference trajectory point, and information relating to a reference trajectory on which the reference trajectory point and the reference target trajectory point are located as reference data corresponding to the reference trajectory point;

designating the reference data corresponding to the reference trajectory point as one training sample;

generating, based on training samples corresponding to the plurality of reference trajectory points, an experience replay pool; and generating the one or more groups of training samples, wherein each group of training samples includes one or more training samples selected from the training samples corresponding to the plurality of reference trajectory points based on the experience replay pool.

* * * * *